(12) United States Patent
Sugitatsu et al.

(10) Patent No.: US 6,507,683 B2
(45) Date of Patent: Jan. 14, 2003

(54) FREE-SPACE OPTICAL SWITCH

(75) Inventors: Atsushi Sugitatsu, Tokyo (JP); Takeshi Saito, Tokyo (JP); Tatsuo Hatta, Tokyo (JP)

(73) Assignee: Mitsubishi Dencki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/953,964

(22) Filed: Sep. 18, 2001

(65) Prior Publication Data

US 2002/0164112 A1 Nov. 7, 2002

(30) Foreign Application Priority Data

Mar. 22, 2001 (JP) .......................... 2001-082635

(51) Int. Cl.[7] ................................ G02B 6/42
(52) U.S. Cl. ................ 385/18; 385/16; 385/17
(58) Field of Search ................ 385/18, 17, 16, 385/19, 20–24

(56) References Cited

U.S. PATENT DOCUMENTS 6,253,001 B1 * 6/2001 Hoen .......................... 385/17

OTHER PUBLICATIONS

Line et al., "Optical–Layer Networking: Opportunities For And Progress In Lightwave Micromachines", AT&T, Labs–Research, Redbank, New Jersey, 2000, pp. 150–195.

* cited by examiner

*Primary Examiner*—Phan T. H. Palmer
(74) *Attorney, Agent, or Firm*—Leydig, Voit & Mayer, Ltd.

(57) ABSTRACT

A free-space optical switch includes a micro-electro-mechanical system (MEMS) mirror array for switching an optical transmission path having an input MEMS mirror array and an output MEMS mirror array confronting an input fiber port array and an output fiber port array, respectively. The input MEMS mirror array and the output MEMS mirror array are integral with each other and divided from each other by at least two intersecting lines.

5 Claims, 9 Drawing Sheets

FREE-SPACE OPTICAL SWITCH

BACKGROUND OF THE INVENTION

1. Field of the Invention

The present invention relates to a free-space optical switch for switching an optical signal path in fields of optical communication, information processing, etc.

It is to be noted that in this specification, the term "micromirror" represents a micro-electro-mechanical system (MEMS) mirror.

2. Description of the Prior Art

FIG. 11 shows an arrangement of a free-space optical switch described at page 168 in a tutorial "Optical-Layer Networking: Opportunities for and Progress in Lightwave Micromachines" by L. Y. Lin et al. in proceedings of the 25th Optical Fiber Communication Conference (OFC 2000). In FIG. 11, a signal light ray incident from an input port array 11 is reflected at a desired angle by an input micromirror array 21 and is propagated to an output port array 12 through angular control of an output micromirror array. Namely, a signal light array 31 incident from a port 111 in the input port array 11 is initially reflected at a desired angle by a micromirror 211 in the input micromirror array 21 and is propagated to a desired port 121 in the output port array 12 through angular control of a micromirror 221 in the output micromirror array 22.

Then, as a switching function of the optical switch, the output port 121 is switched to an output port 122. To this end, the micromirror 211 of the input micromirror array 21 undergoes angular change so as to propagate to a micromirror 222 of the output micromirror array 22 the signal light ray 31 from the input port 111 and the micromirror 222 performs corresponding angular control of the signal light ray 31 so as to propagate the signal light ray 31 to the output port 122 such that the optical path is switched. In angular control of the micromirrors in switching of the optical path, when the optical path proceeds from the micromirror 211 at one diagonal end of one micromirror array 21 in the opposing micromirror arrays 21 and 22 to the micromirror 222 at the other diagonal end of the other micromirror array 22, the micromirror 211 undergoes a maximum angular change.

Meanwhile, FIG. 12 shows an arrangement of a free-space optical switch described at page 167 of the above mentioned tutorial. In FIG. 12, a fixed mirror 4 is arranged and the input port array 11 and the output port array 12 of FIG. 11 are integrally formed into a port array 13, while the input micromirror array 21 and the output micromirror array 22 of FIG. 11 are integrally formed into a micromirror array 23 such that a function similar to that of FIG. 11 is fulfilled. Also in the arrangement of FIG. 12, when the optical path proceeds from the micromirror 211 to a micromirror 223 which are, respectively, disposed at one diagonal end and the other diagonal end in the integral micromirror array 23, the micromirror 211 undergoes a maximum angular change.

In the conventional optical switches of FIGS. 11 and 12, the micromirrors 211, 221, 222 and 223 should be subjected to angular control. However, the micromirror produced by micromachine technology has such a drawback that it is structurally difficult to cause a large angular change owing to difficulty in materializing a large scale in a vertical direction of the micromirror in comparison with that in a horizontal direction of the micromirror in thin film deposition technology, etching technology or the like.

Meanwhile, the micromirror is disadvantageous in that since it is difficult to produce a large driving force such as electrostatic force, magnetic field of the like in the vertical direction of the micromirror in terms of its driving principle, it is difficult to effect a large angular change.

SUMMARY OF THE INVENTION

Accordingly, an essential object of the present invention is to provide, with a view to eliminating the above mentioned drawbacks of prior art free-space optical switches, a free-space optical switch which is highly reliable by minimizing amount of angular change of an input micromirror or is more compact by minimizing an overall optical path length in case the amount of angular change of the input micromirror is identical on the contrary.

In order to accomplish this object of the present invention, a free-space optical switch according to the present invention comprises: a micro-electro-mechanical system (MEMS) mirror array for switching an optical transmission path, in which an input MEMS mirror array and an output MEMS mirror array confronting an input fiber port array and an output fiber port array, respectively are provided, wherein the input MEMS mirror array and the output MEMS mirror array are formed integrally with each other; wherein instead of equally dividing the MEMS mirror array into the input MEMS mirror array and the output MEMS mirror array simply by a single boundary line, one or both of the input MEMS mirror array and the output MEMS mirror array are further divided so as to be arranged.

BRIEF DESCRIPTION OF THE DRAWINGS

This object and features of the present invention will become apparent from the following description taken in conjunction with the preferred embodiments thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Hereinafter, embodiments of the present invention are described with reference to the drawings.

(First Embodiment)

Figure 1:
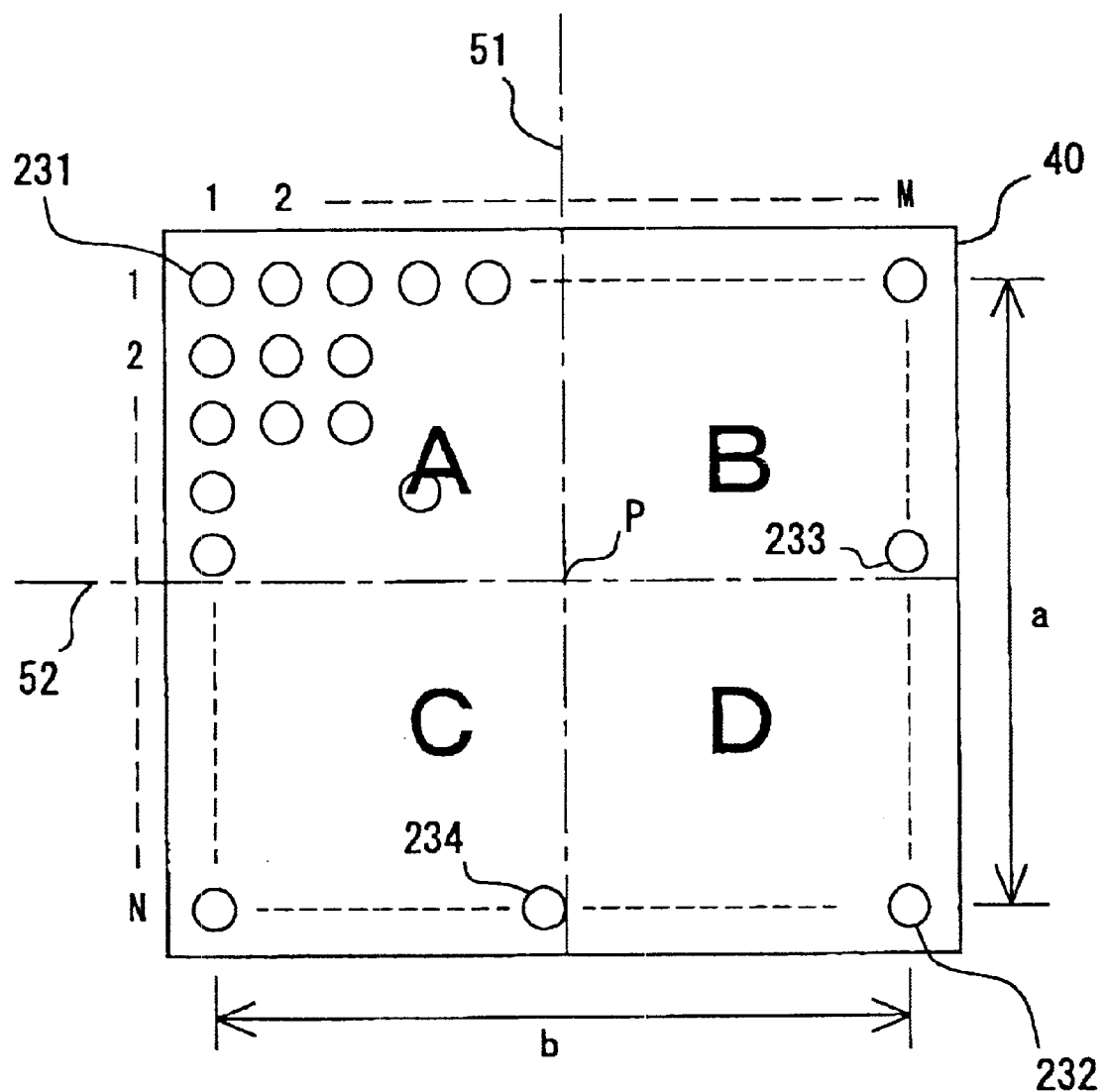
FIG. 1 is a front elevational view of a micromirror array employed in a free-space optical switch according to a first embodiment of the present invention.
Figure 12:
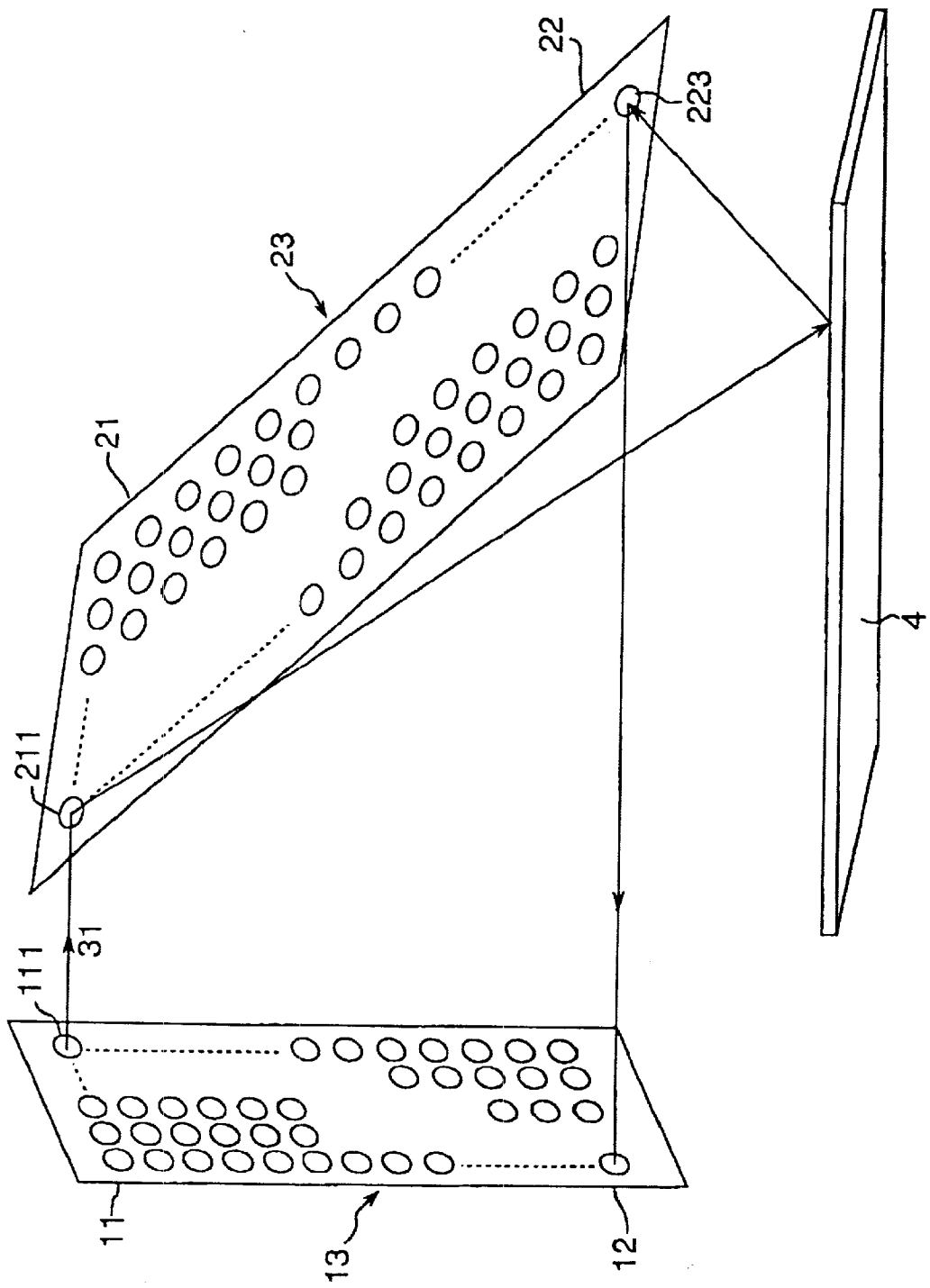
FIG. 12 is a perspective view showing an arrangement of another prior art free-space optical switch.

FIG. 1 shows an N-row×M-column MEMS mirror array, i.e., micromirror array 40 employed in a free-space optical switch according to a first embodiment of the present invention. This optical switch has an arrangement similar to that of the prior art free-space optical switch of FIG. 12. N×M/2 ports constitute an input micromirror array corresponding to input ports, while the remaining N×M/2 ports constitute an output micromirror array corresponding to output ports. Since each port can be regarded as a point of coordinates, each port is handled as a point below for simplification of the following description.

A signal light ray reflected by an input micromirror proceeds to an output micromirror via a fixed mirror (not shown). If the input micromirror and the output micromirror are disposed diagonally in the micromirror array 40, the input micromirror needs to carry out a maximum angular change. Namely, a maximum angular displacement of the input micromirror corresponds to a case in which a distance between the micromirrors on the micromirror array 40 assumes a maximum value. Therefore, in order to minimize the maximum angular displacement of the input micromirror, comparative study for minimizing the distance between the micromirrors on the micromirror array 40 may be made.

In FIG. 1, if the micromirror array 40 is divided into regions for a group of input micromirrors and a group of output micromirrors most instinctively, the micromirror array 40 will be divided into halves by a vertical centerline 51 or a lateral centerline 52 such that the group of the input micromirrors are arranged in one of the halves and the group of the output micromirrors are arranged in the other of the halves. In the optical switch, an arbitrary input port should be switched to an arbitrary output port. Thus, when a signal light ray is propagated from an input micromirror 231 disposed at one diagonal end of the micromirror array 40 to an output port 232 disposed at the other diagonal end of the micromirror array 40, angular displacement of the input micromirror 231 reaches a maximum value. Supposing that characters "a" and "b" denote a vertical length and a lateral length of the N-row×M-column micromirror array 40, respectively, a distance between the input micromirror 231 and the output micromirror 232 is expressed as follows.

$$\sqrt{a^2+b^2} \quad (1)$$

In this embodiment, by optimizing division of the micromirror array 40 into the regions for the group of the input micromirrors and the group of the output micromirrors, a maximum value of necessary angular displacement of the input micrometer is lessened. Namely, the micromirror array 40 is equally divided into four regions A, B, C and D by the vertical centerline 51 and the lateral centerline 52 of FIG. 1 such that the group of the input micromirrors are provided in the regions A and D and the group of the output micromirrors are provided in the regions B and C.

As a result, a path leading to a maximum angular displacement traces from the input micromirror 231 in the region A to an output micromirror 233 in the region B or an output micromirror 234 in the region C. At this time, a distance between the input micromirror 231 and the output micromirror 233 or 234 is given as follows.

$$\sqrt{\frac{a^2}{4}+b^2} \quad \text{Or} \quad (2)$$

$$\sqrt{a^2+\frac{b^2}{4}} \quad (3)$$

Thus, the above distance (2) or (3) between the input micromirror 231 and the output micromirror 233 or 234 can be made smaller than the conventional distance (1) between the input micromirror 231 and the output micromirror 232. Therefore, by lessening a maximum angular displacement of the input micromirror 231, reliability of the optical switch can be upgraded. Alternatively, if amount of angular change of the input micromirror 231 is identical, an optical system of the optical switch can be made compact by minimizing its overall optical path length.

Figure 2:
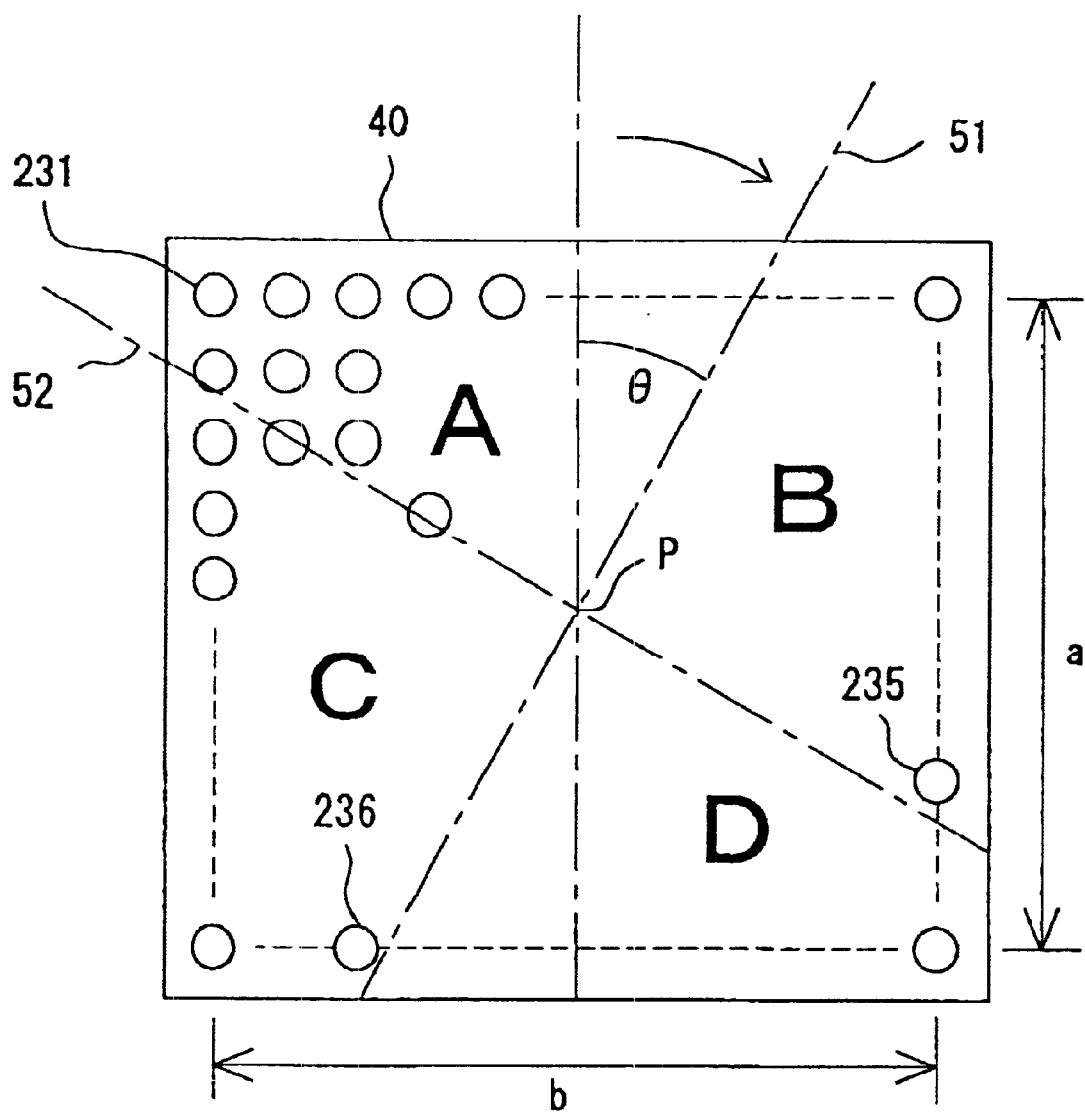
FIG. 2 is a front elevational view of a micromirror array which is a first modification of the micromirror array of FIG. 1.

Meanwhile, if the vertical centerline 51 and the lateral centerline 52 in FIG. 1 are rotated through, for example, an arbitrary angle θ about a point P of intersection between the vertical centerline 51 and the lateral centerline 52 by maintaining the identical area of the regions A, B, C and D as shown in FIG. 2 so as to divide the micromirror array 40 equally, the distance between the input micromirror and the output micromirror can be made smaller than the above conventional distance (1). Namely, a path leading to a maximum angular displacement traces from the input micromirror 231 in the region A to an output micromirror 235 in the region B or an output micromirror 236 in the region C. At this time, a distance between the input micromirror 231 and the output micromirror 235 or 236 is given as follows.

$$\sqrt{\left(\frac{a}{2}+\frac{b}{2}\cdot\tan\theta\right)^2+b^2} \quad \text{Or} \quad (4)$$

$$\sqrt{a^2+\left(\frac{b}{2}-\frac{a}{2}\cdot\tan\theta\right)^2} \quad (5)$$

Thus, the above distance (4) or (5) between the input micromirror 231 and the output micromirror 235 or 236 can be made smaller than the conventional distance (1) between the input micromirror 231 and the output micromirror 232. Therefore, by lessening a maximum angular displacement of the input micromirror 231, reliability of the optical switch can be upgraded. Alternatively, if amount of angular change of the input micromirror 231 is identical, an optical system of the optical switch can be made compact by minimizing its overall optical path length. However, when the rotational angle θ assumes arctan(a/b), the distance (4) or (5) is not smaller than the distance (1). Hence, in order to make the distance (4) or (5) smaller than the distance (1), a condition (0≦θarctan(a/b)) should be satisfied.

Figure 3:
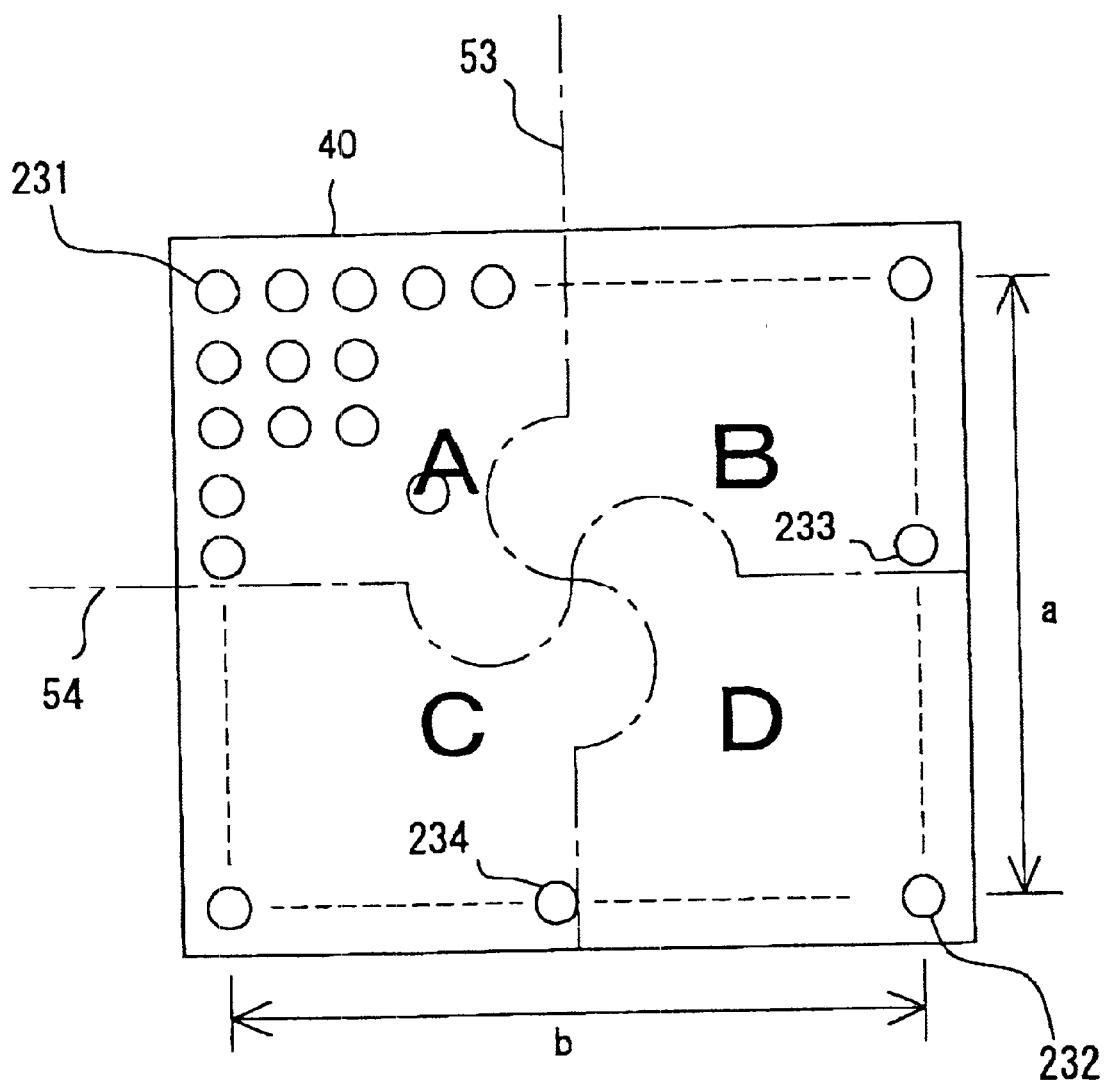
FIG. 3 is a front elevational view of a micromirror array which is a second modification of the micromirror array of FIG. 1.

In this embodiment, region boundary lines are formed by the straight lines. However, even if region boundary lines 53 and 54 have arbitrary shapes as shown in FIG. 3, the same effect can be gained as long as the identical area of the areas A, B, C and D is maintained.

Meanwhile, each input micromirror and each micromirror on the micromirror array 40 corresponds, by one-to-one, to each input port or each output port and initial inclination is set such that a signal light ray reflected by each micromirror is reflected by the fixed mirror orthogonally to an optical axis extending from each input port or each output port to each micromirror and returns on its original path.

(Second embodiment)

Figure 4:
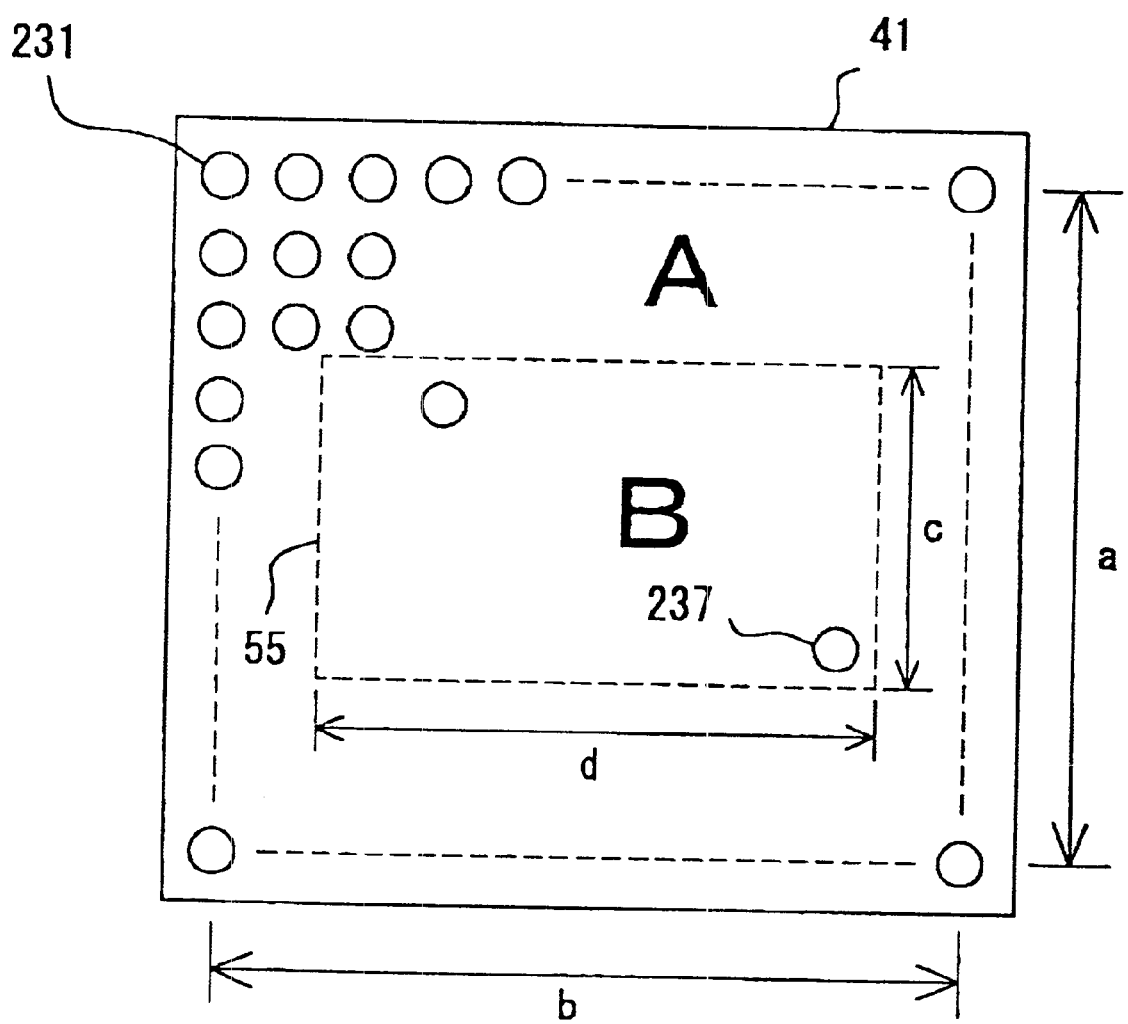
FIG. 4 is a front elevational view of a micromirror array employed in a free-space optical switch according to a second embodiment of the present invention.

FIG. 4 shows a micromirror array 41 employed in a free-space optical switch according to a second embodiment of the present invention. The micromirror array 41 is divided into two regions A and B by a rectangular boundary line 55 in place of the boundary lines 51 and 52 and a group of input micromirrors and a group of output micromirrors are, respectively, provided in the regions A and B such that a necessary maximum angular displacement of the input micromirror is lessened. Namely, supposing that characters "c" and "d" in FIG. 4 denote a vertical length and a lateral length of the rectangular region B bounded by the boundary line 55, respectively, the vertical length c and the lateral length d should satisfy the following conditions (6) and (7).

$$a \cdot b = 2c \cdot d \tag{6}$$

$$c \leq a, d \leq b \tag{7}$$

If the group of the input micromirrors and the group of the output micromirrors are, respectively, provided in the regions A and B or vice versa, a path leading to a maximum angular displacement traces from the input micromirror 221 in the region A to an output micromirror 237 in the region B. At this time, a distance between the input micromirror 231 and the output micromirror 237 is given as follows.

$$\sqrt{\left(\frac{a}{2}+\frac{c}{2}\right)^2+\left(\frac{b}{2}+\frac{d}{2}\right)^2} \tag{8}$$

Thus, the above distance (8) between the input micromirror 231 and the output micromirror 237 can be made smaller than then conventional distance (1) between the input micromirror 231 and the output micromirror 232. Therefore, by lessening a maximum angular displacement of the input micromirror 231, reliability of the optical switch can be upgraded. Alternatively, if amount of angular change of the input micromirror 231 is identical, an optical system of the optical switch can be made compact by minimizing its overall optical path length.

Meanwhile, in this embodiment, the region B is formed into a rectangular shape and the above equation (6) corresponds to the rectangular region B. However, if the regions A and B have an identical area, the region B may have an arbitrary shape.

(Third embodiment)

Figure 5:
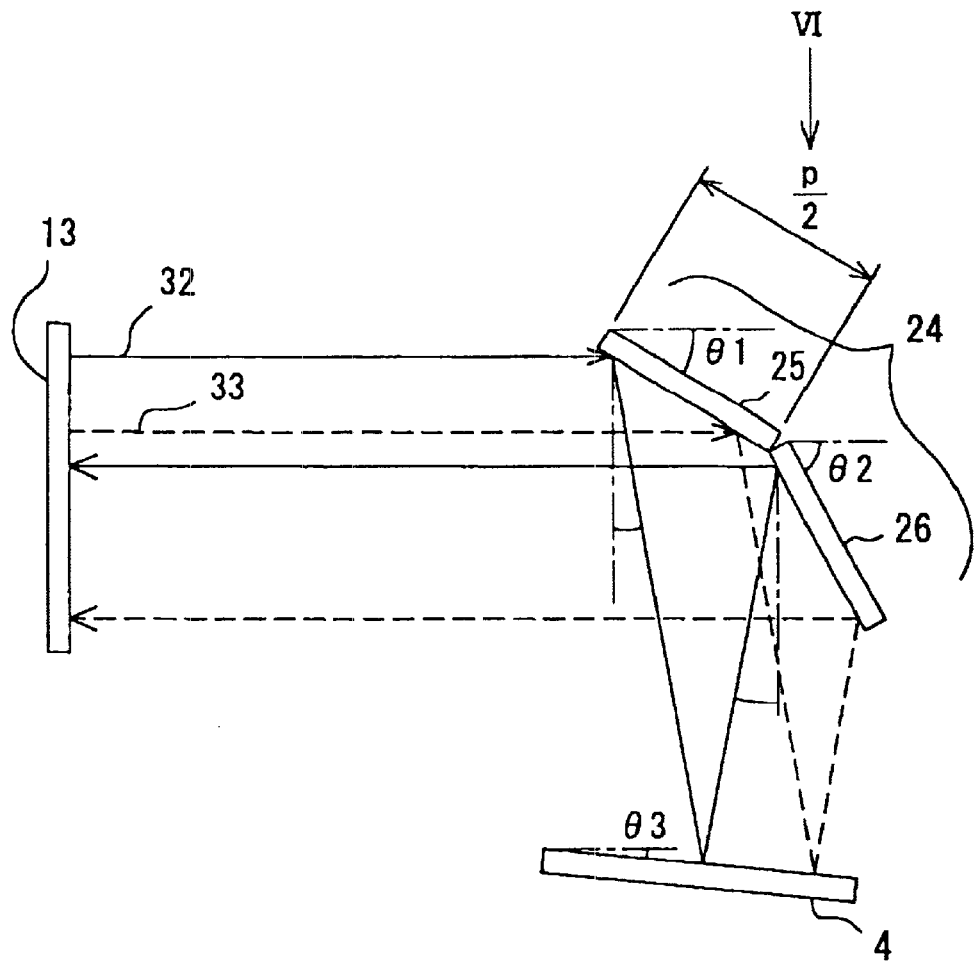
FIG. 5 is a side elevational view of a free-space optical switch according to a third embodiment of the present invention.
Figure 6:
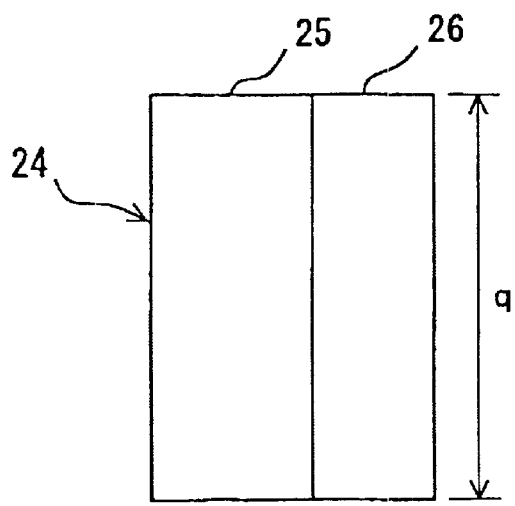
FIG. 6 is a view of a micromirror array of the free-space optical switch of FIG. 5 as observed in the direction of the arrow VI in FIG. 5.

FIGS. 5 and 6 show a micromirror array 24 employed in a free-space optical switch according to a third embodiment of the present invention. As shown in FIG. 6, the micromirror array 24 has a width q. A group 25 of input micromirrors and a group 26 of output micromirrors on the micromirror array 24 do not have an identical reference angle and are angularly arranged so as to confront each other towards a fixed mirror 4 about an axis orthogonal to a drawing sheet of FIG. 5 such that a necessary maximum angular displacement of the input micromirror is lessened.

Namely, by inclining the group 25 of the input micromirrors, the group 26 of the output micromirrors and the fixed mirror 4 at angles θ1, θ2 and θ3 relative to a propagation optical axis, respectively, each input port forms a propagation path to each corresponding output port in reference angle state of each micromirror. Here, the following condition (9) should be satisfied.

$$\pi + 2\theta 3 = 2(\theta 1 + \theta 2) \tag{9}$$

By the above described arrangement, a distance between the input micromirror and the output micromirror, which corresponds to a path leading to a maximum angular displacement, is given as follows.

$$\sqrt{\left(\frac{p}{2}\right)^2 + q^2} \tag{10}$$

On the other hand, in case micromirrors of reference angle are arranged such that an input signal light ray 32 is returned to the input micromirror by the fixed mirror 4, a distance between the input micromirror and the output micromirror is given as follows.

$$\sqrt{p^2+q^2} \tag{11}$$

Thus, the distance (10) between the input micromirror and the output micromirror can be made smaller than the distance (11) between the input micromirror and the output micromirror. Therefore, by lessening a maximum angular displacement of the input micromirror, reliability of the optical switch can be upgraded. Alternatively, if amount of angular change of the input micromirror is identical, an optical system of the optical switch can be made compact by minimizing its overall optical path length. Meanwhile, in FIG. 5, an input signal light ray 33 is illustrated in addition to the input signal light ray 32.

Figure 7:
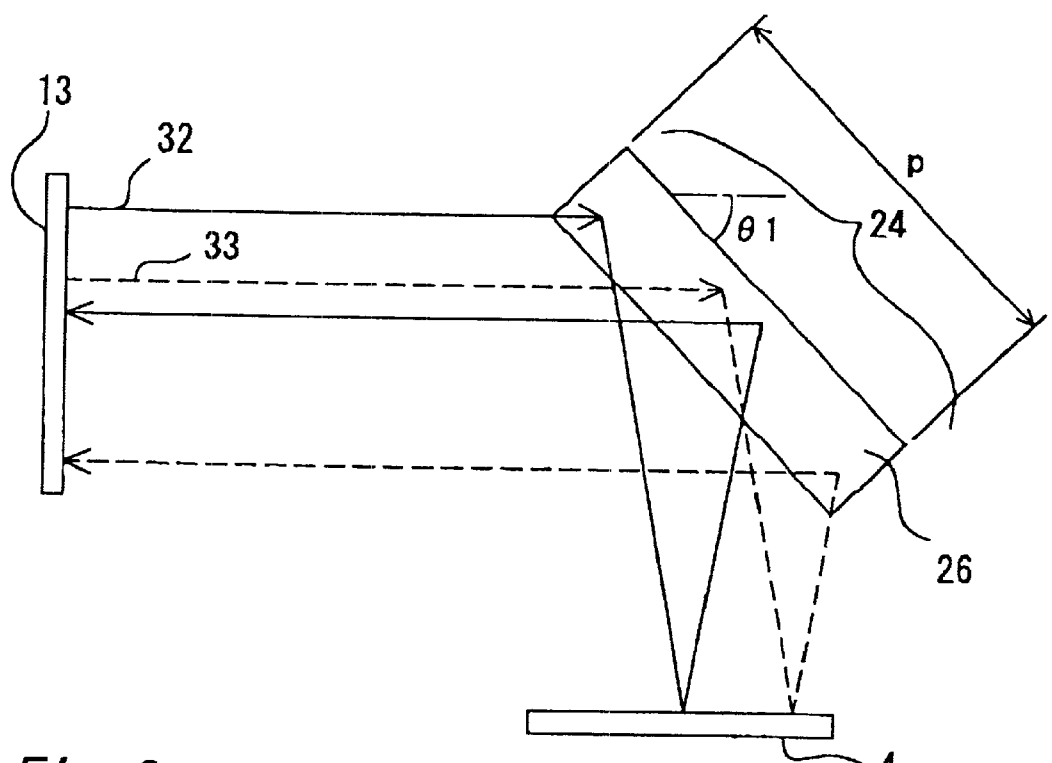
FIG. 7 is a side elevational view of a free-space optical switch which is a modification of the free-space optical switch of FIG. 5.
Figure 8:
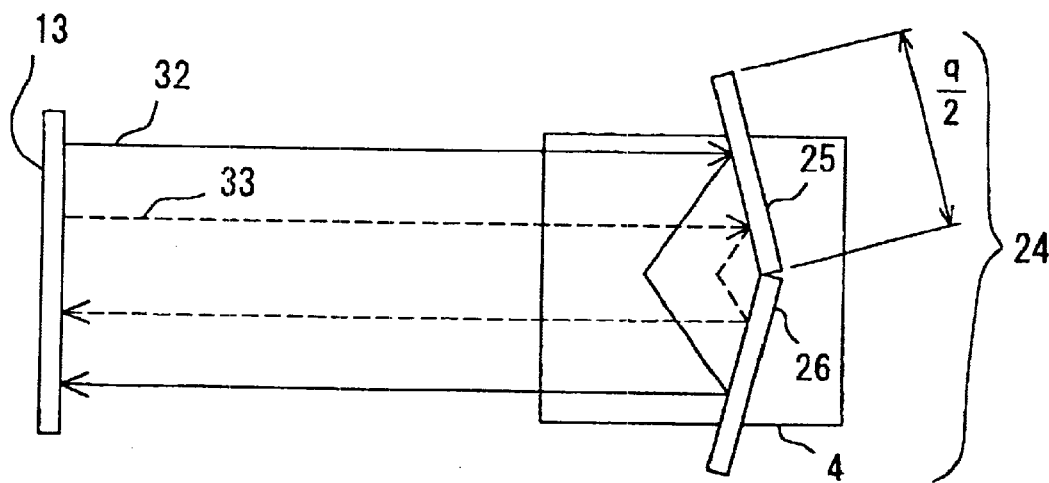
FIG. 8 is a schematic top plan view of the free-space optical switch of FIG. 7.

As shown in FIGS. 7 and 8, the group 25 of the input micromirrors and the group 26 of the output micromirrors on the micromirror array 24 may be angularly arranged so as to confront each other towards the fixed mirror 4 about an axis parallel to a drawing sheet of FIG. 7 such that a necessary maximum angular displacement of the input micromirror is lessened. In the micromirror array 24 of FIG. 7, a ridgeline along which the group 25 of the input micromirrors and the group of the output micromirrors intersect with each other is inclined at an angle θ1 relative to a propagation optical axis.

By the above described arrangement, a distance between the input micromirror and the output micromirror, which corresponds to a path leading to a maximum angular displacement, is given as follows.

$$\sqrt{p^2 + \left(\frac{q}{2}\right)^2} \tag{12}$$

Thus, the above distance (12) between the input micromirror and the output micromirror can be made smaller than the distance (11) in which the micromirrors of reference angle are arranged such that the input signal light ray 32 is returned to the input micromirror by the fixed mirror 4. Therefore, by lessening a maximum angular displacement of the input micromirror, reliability of the optical switch can be upgraded. Alternatively, if amount of angular change of the input micromirror is identical, an optical system of the optical switch can be made compact by minimizing its overall optical path length.

In this embodiment, each of planes of the group 25 of the input micromirrors and the group 26 of the output micromirrors is arranged so as to be inclined as a whole. However, if position of reference angle of each micromirror can be set independently of the planes of the group 25 of the input micromirrors and the group 26 of the output micromirrors and operating angle of each micromirror can be set arbitrarily within a range of a relative value from its reference position, the same effect can be achieved by setting an input micromirror 25n and an output micromirror 26n to predetermined angles similar to those of this embodiment.

(Fourth embodiment)

Figure 9:
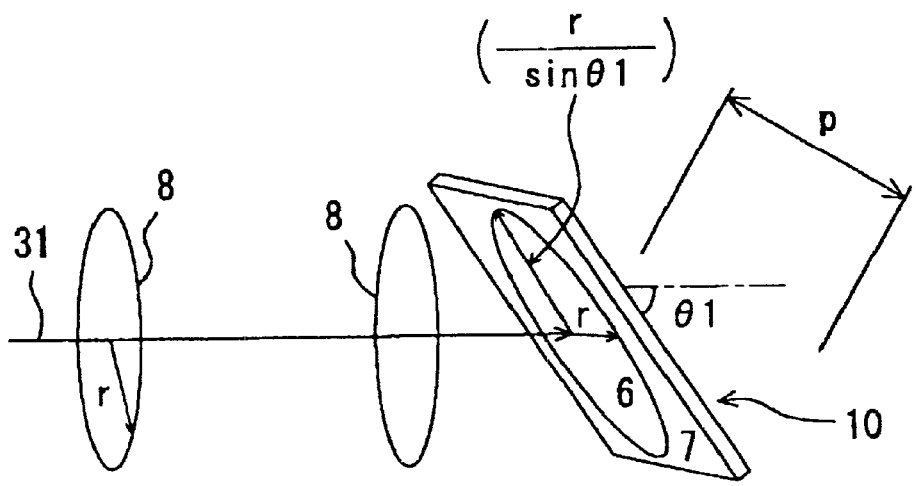
FIG. 9 is a perspective view showing a micromirror employed in a free-space optical switch according to a fourth embodiment of the present invention.

FIG. 9 shows an input micromirror or an output micromirror 10 employed in a free-space optical switch according to a fourth embodiment of the present invention. The input micromirror 10 includes an optically effective micromirror portion 6 for reflecting a signal light ray 31 and an optically ineffective portion 7 forming a structure. Since the signal light ray 31 passes through an axially symmetric collimator optical system from an optical fiber, the signal light ray 31 has a shape 8 symmetrical with respect to a propagation optical axis. Therefore, in order to minimize eclipse loss at the micromirror portion 6, the micromirror portion 6 may be formed into an elliptic shape in which a dimension of an inclined major axis and a dimension of a mirror axis free from inclination are set at a ratio of $(1/\sin\theta1)$ to 1 in accordance with an angle $\theta1$ of inclination of the input micrometer 10. As a result, transmission loss can be reduced.

Figure 10:
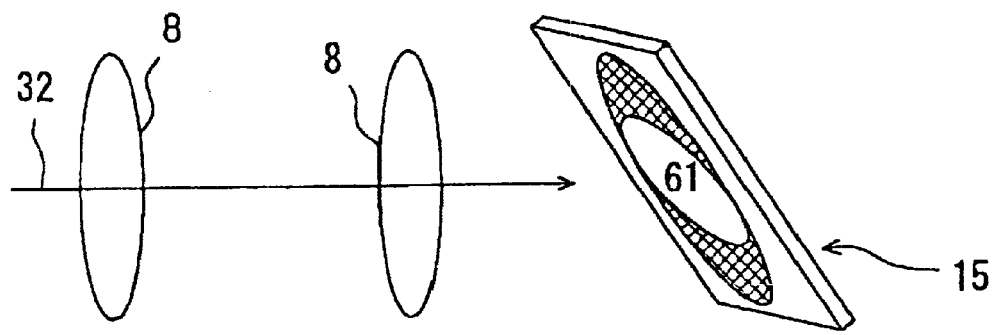
FIG. 10 is a perspective view showing a micromirror acting as a comparative example of the micromirror of FIG. 9.
Figure 11:
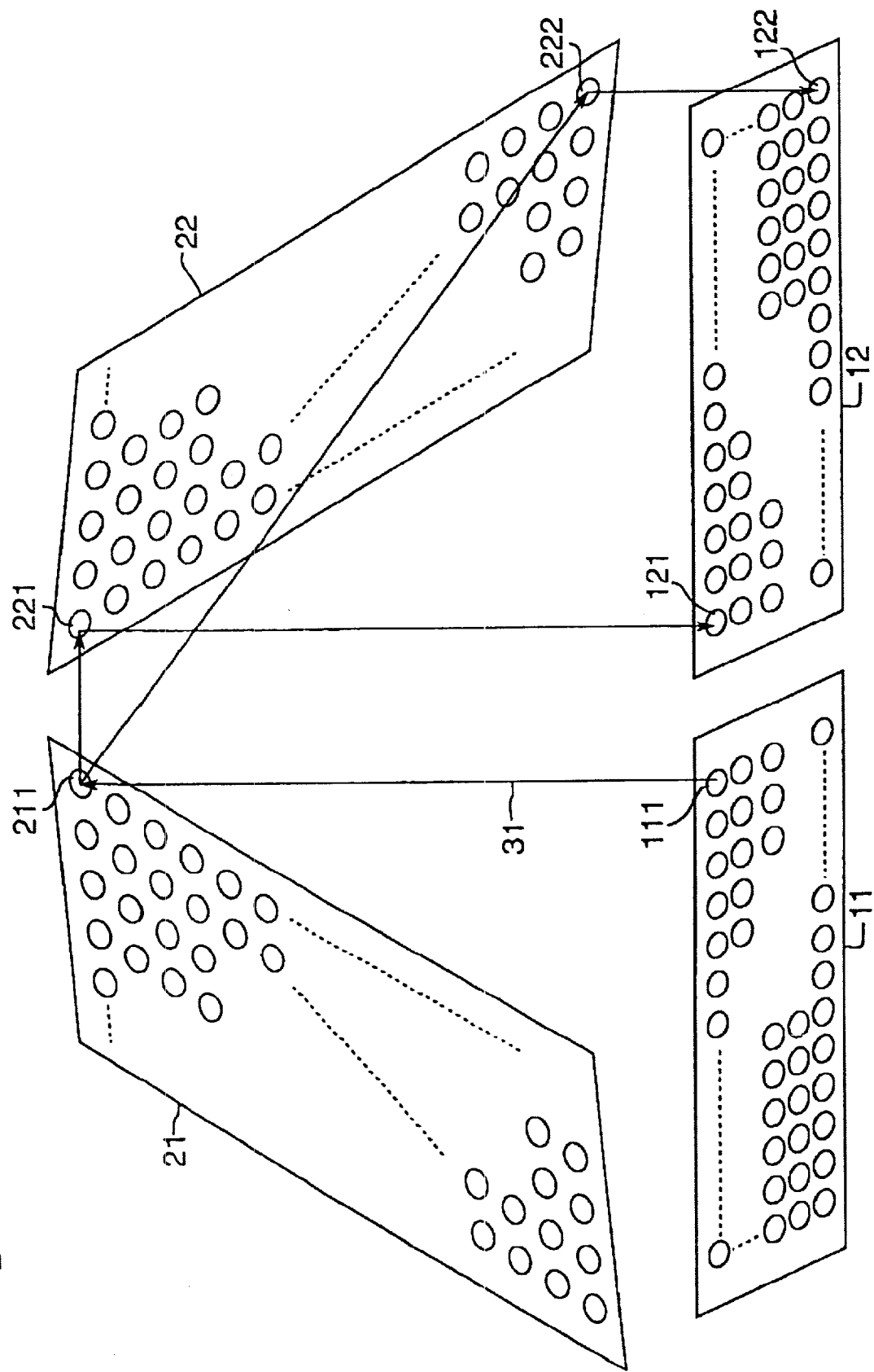
FIG. 11 is a perspective view showing an arrangement of a prior art free-space optical switch.

If a nonelliptic micromirror portion, for example, a circular micromirror portion 61 is provided in an input micromirror 15 as shown in FIG. 10, a hatching portion in FIG. 10 suffers eclipse loss.

Even if the elliptic shape of the micromirror portion 6 in FIG. 9 is replaced by a shape including a projected image of the shape 8 of the signal light ray 31, for example, a rectangular shape in which a dimension of a short side and a dimension of a long side are set at a ratio of 1 to $(1/\sin\theta1)$, the same effect can be obtained.

As is clear from the foregoing description, the following marked effects (1) to (6) can be gained in the free-space optical switch of the present invention.

(1) Since the input MEMS mirror array and the output MEMS mirror array are formed integrally with each other and instead of equally dividing the MEMS mirror array into the input MEMS mirror array and the output MEMS mirror array simply by signal boundary line, one or both of the input MEMS mirror array and the output MEMS mirror array are further divided so as to be arranged, the maximum angular displacement of the input micromirror can be lessened. Alternatively, the optical system of the optical switch can be made compact.

(2) Since the input MEMS mirror array and the output MEMS mirror array are formed integrally with each other and the input MEMS mirror array and the output MEMS mirror array are arranged such that one of the input MEMS mirror array and the output MEMS mirror array surrounds the other of the input MEMS mirror array and the output MEMS mirror array, the maximum angular displacement of the input micromirror can be lessened. Alternatively, the optical system of the optical switch can be made compact.

(3) Since the MEMS mirror array is separated into the input MEMS mirror array and the output MEMS mirror array and the input MEMS mirror array and the output MEMS mirror array are angularly arranged so as to confront each other towards the fixed reflector, the maximum angular displacement of the input micromirror can be lessened. Alternatively, the optical system of the optical switch can be made compact.

(4) Since the input MEMS mirror array, the output MEMS mirror array and the fixed reflector are, respectively, inclined at the angles $\theta1$, $\theta2$ and $\theta3$ relative to the propagation optical axis such that the angles $\theta1$, $\theta2$ and $\theta3$ have the relation of $\{\pi+2\theta3=2(\theta1+\theta2)\}$, the maximum angular displacement of the input micromirror can be lessened. Alternatively, the optical system of the optical switch can be made compact.

(5) Since each MEMS mirror of the input MEMS mirror array and the output MEMS mirror array is inclined at the predetermined angle relative to the propagation optical axis and is formed long in the direction of inclination of each MEMS mirror in accordance with the predetermined angle such that the shape of each MEMS mirror is symmetrical with respect to the propagation optical axis when projected towards a corresponding one of the input fiber ports and the output fiber ports, eclipse loss can be minimized and thus, transmission loss can be reduced.

(6) Since the predetermined angle is $\theta1$ and the dimension of each MEMS mirror in the direction of inclination of each MEMS mirror is set to be a product of $(1/\sin\theta1)$ and the dimension of each MEMS mirror in the direction other than the direction of inclination of each MEMS mirror, eclipse loss can be minimized and thus, transmission loss can be reduced.

What is claimed is:

1. A free-space optical switch comprising a micro-electro-mechanical system (MEMS) mirror array for switching an optical transmission path, the MEMS including an input MEMS mirror array and an output MEMS mirror array confronting an input fiber port array and an output fiber port array, respectively, wherein the input MEMS mirror array and the output MEMS mirror array are integral with each other, and the MEMS mirror array is divided into the input MEMS mirror array and the output MEMS mirror array by at least two intersecting lines.

2. A free-space optical switch comprising a micro-electro-mechanical system (MEMS) mirror array for switching an optical transmission path, the MEMS including an input MEMS mirror array and an output MEMS mirror array confronting an input fiber port array and an output fiber port array, respectively, wherein the MEMS mirror array is separated into the input MEMS mirror array and the output MEMS mirror array and the input MEMS mirror array and the output MEMS mirror array are angularly arranged and confront a fixed reflector.

3. The free-space optical switch according to claim 2, wherein the input MEMS mirror array, the output MEMS mirror array, and the fixed reflector are, respectively, inclined at angles of $\theta1$, $\theta2$, and $\theta3$ relative to a propagation optical axis so that the angles $\theta1$, $\theta2$, and $\theta3$ have a relation of $\{\pi+2\theta3=2(\theta1+\Theta2)\}$.

4. A free-space optical switch comprising a micro-electro-mechanical system (MEMS) mirror array for switching an optical transmission path, the MEMS including an input MEMS mirror array and an output MEMS mirror array confronting an input fiber port array and an output fiber port array, respectively, wherein each MEMS mirror of the input MEMS mirror array and the output MEMS mirror array is inclined at an angle relative to a propagation optical axis, is longer in a direction of inclination, and has a shape symmetrical with respect to the propagation optical axis when projected towards a corresponding input fiber port and output fiber port.

5. The free-space optical switch according to claim 4, wherein the angle is $\theta1$ and a dimension of each MEMS mirror in the direction of inclination of each MEMS mirror is a product of $(1/\sin\theta1)$ and a dimension of each MEMS mirror in a direction other than the direction of inclination of each MEMS mirror.

* * * * *

UNITED STATES PATENT AND TRADEMARK OFFICE
CERTIFICATE OF CORRECTION

PATENT NO. : 6,507,683 B2
DATED : January 14, 2003
INVENTOR(S) : Sugitatsu et al.

It is certified that error appears in the above-identified patent and that said Letters Patent is hereby corrected as shown below:

<u>Title page,</u>
Item [73], Assignee, change "Mitsubishi Dencki Kabushiki Kaisha" to -- Mitsubishi Denki Kabushiki Kaisha --.

Signed and Sealed this

Twenty-ninth Day of July, 2003

JAMES E. ROGAN
*Director of the United States Patent and Trademark Office*